United States Patent Office 3,781,283
Patented Dec. 25, 1973

3,781,283
PROCESS FOR PREPARING CEPHEM-4-CARBOXYLIC ACID ESTERS
Dieter Bormann, Kelkheim, Taunus, and Manfred Worm, Mainz, Germany, assignors to Farbwerke Hoechst Aktiengesellschaft vormals Meister Lucius & Bruning, Frankfurt am Main, Germany
No Drawing. Filed Dec. 28, 1971, Ser. No. 213,217
Claims priority, application Germany, Dec. 28, 1970,
P 20 64 107.0
Int. Cl. C07d 99/24
U.S. Cl. 260—243 C                6 Claims

ABSTRACT OF THE DISCLOSURE

Process for preparing a cephem-carboxylic acid ester of the formula

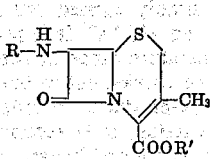

by heating a penicillin oxide of the formula

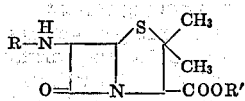

in a solvent with a phosphonium salt of the formula

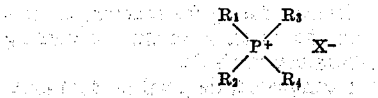

In the formulas: R is acyl; R' is alkyl, substituted alkyl, cycloalkyl, or aryl; $R_1$, $R_2$, and $R_3$ are each substituted or unsubstituted hydrocarbon; $R_4$ is methyl substituted by an electron-attracting group, and may contain a further substituent; and X is an anion.

---

The present invention relates to processes for preparing certain cephem-carboxylic acid esters.

It is known from U.S. Pat. 3,275,626 that penicillin-sulfoxide esters can be converted, by heating to 100° C. to 175° C. under acid conditions, to acyl derivatives of 7-amino-3-methyl-Δ³-cephem - 4 - carboxylic acid esters. The reaction, however, proceeds with such low yields that its economical utilization is practically excluded.

Now, it has been found that cephem-carboxylic acid esters of the general formula

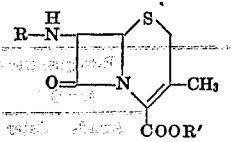 (1)

in which R represents an acyl radical and R' represents a straight chain or branched, optionally substituted, alkyl or cycloalkyl radical or an aryl radical, can be prepared by heating penicillin-oxides of the general formula

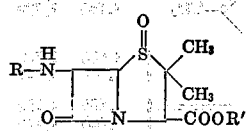 (2)

in which R and R' have the meanings given above, in the presence of phosphonium salts of the general formula

 (3)

in which $R_1$, $R_2$ and $R_3$ represent a hydrocarbon radical which may be substituted, in particular an aliphatic or aromatic hydrocarbon radical which may be substituted or a cycloaliphatic, cycloaliphatic-aliphatic or araliphatic hydrocarbon radical which may be substituted, and $R_4$ represents a methyl group which is substituted by an electron-attracting radical and may contain a further substituent, and $X^\ominus$ represents the anion of an organic or inorganic acid.

Penicillin-sulfoxide esters of the General Formula 2 can be prepared in various ways, for example by the oxidation of penicillin salts and following subsequent esterification of the 6-acylamino-penicillane-sulfoxide acids (J. Am. Chem. Soc. 91, 1401 (1969)) or by esterification of 6 - acylamino-penicillanic acid and subsequent oxidation (J. Org. Chem. 27, 1381 (1962)).

The acyl radical R in the General Formula 2 can be identical with the acyl radicals in natural penicillins or it may also be introduced by acylation of 6-amino-penicillanic acid.

If the acyl radical contains groups, for example amino or carboxyl groups, which under the reaction conditions may give rise to side reactions or decomposition reactions, these must be protected in known manner, for example by carbobenzoxylation or by esterification. After the reaction, these protective groups can be split off in known manner.

Examples of the acyl radical R are the radicals of the following formulae:

(1) $R^a(CH_2)_nCO—$, in which $R_a$ represents an aryl, cycloalkyl, a substituted cycloalkyl radical and $n$ represents an integer of from 1 to 4. As examples of this group, there may be mentioned phenylacetyl, nitrophenylacetyl and phenylpropionyl.

(2) $C_nH_{2n+1}CO—$, in which $n$ represents an integer of from 2 to 8. The alkyl group may have a straight chain or a branched chain and may also be interrupted by one oxygen atom or one sulfur atom. Examples of such groups are hexanoyl, heptanoyl, octanoyl and butyl-thioacetyl groups.

(3) $C_nH_{2n-1}CO—$, in which $n$ represents an integer of from 2 to 8. The alkenyl group may be a straight chain or branched chain group and may also be interrupted by one oxygen atom or one sulfur atom. Examples of such groups are the acrylyl, crotonyl and allylthio-acetyl groups.

(4) $R^aOCR^bR^c—CO—$, in which $R^a$ has the meaning given under (1) and $R^b$ and $R^c$, which may be identical or different, represent hydrogen atoms or alkyl groups. An example of such a group is the phenoxyacetyl group.

(5) $R^aSCR^bR^c—CO—$, in which $R^a$, $R^b$ and $R^c$ have the meanings given above. Examples of such thio-groups are the S-phenyl-thioacetyl, S-chlorophenyl-thioacetyl and S-bromophenyl-thioacetyl groups.

(6) $R^a(CH_2)_mS(CH_2)_nCR^bR^c—CO$, in which $R^a$, $R^b$ and $R^c$ have the meanings given above, $m$ represents an integer of from 1 to 4, and $n$ represents the number 0 to 4. Examples of such groups are the S-benzyl-thioacetyl, the benzyl-thiopropionyl and the β-phenethyl-thioacetyl groups.

(7) $R^aCO—$, in which $R^a$ has the meaning given above. Examples of such groups are benzoyl, substituted benzoyl and cyclopentanoyl groups. If the benzoyl group is substituted, the substituents may be alkyl or alkoxy groups and the substituents may stand in the 2-, or 2- and 6-positions. A suitable 2,6-disubstituted benzoyl group is, for example the 2,6-dimethoxy-benzoyl group.

In the reaction according to the invention, it is preferred to use such compounds in which the radical R' can be easily split off after the re-arrangement, without the bi-cyclic structure of the cephem-carboxylic acid ester formed of the Formula 1 being modified. Examples of such radicals R' are the benzyl, p-nitrobenzyl, p-methoxybenzyl, benzhydryl, trityl, 2,2,2-trichloroethyl, t-butyl, phenacyl, isobornyl and adamantyl groups.

As phosphonium compounds of the above-mentioned Formula 3, there are used in particular those in which the radicals $R_1$, $R_2$ and $R_3$ stand for identical or different alkyl groups, especially those containing 4 to 10 carbon atoms, or aryl groups, especially those of the benzene series. Preferably, compounds having such radicals $R^1$ to $R_3$ are used which are industrially easily accessible and easily manipulable. Examples of such radicals are the n-butyl, n-octyl, phenyl, tolyl and benzyl radicals. The electron-attracting substituent of the methyl group $R_4$ is preferably a cyano, carbalkoxy, p-nitrophenyl- or acyl group. The carbalkoxy groups are preferably ester groups of alkanols having 1 to 8 carbon atoms, which may also be substituted, for example by phenyl groups. As acyl radicals, there may be used above all the acetyl group and also acryloyl radicals, in particular those of the benzene series, which may be substituted by chlorine or bromine atoms, lower alkyl, lower alkoxy and/or nitro groups. Examples of the second substituent of the methyl group $R_4$ are lower alkyl groups, aryl groups in particular those of the benzene series, and acyl-amido groups of the formula

in which A and B stand for identical or different alkyl groups having 1 to 8 carbon atoms, which may be substituted by a phenyl group. Furthermore, B may stand for an aryl group, in particular one of the benzene series. The groups A and B may also be linked, ring-like, with formation of an alkylene group having 2 to 11 carbon atoms, which may be substituted by lower alkyl groups.

Particularly suitable are those phosphonium salts which dissolve at least partly under the reaction conditions in the reaction medium. Furthermore, such phosphonium salts are preferred which are derived from amidosulfonic acid, sulfuric acid, phosphoric acids, phosphonic acids and sulfonic acids; the phosphonium salts of hydrohalic acids, too, are suitable reagents for the re-arrangement.

The phosphonium salts used according to the invention may be prepared in various ways, for example by addition of the corresponding acids onto ylid compounds, it not being absolutely necessary to isolate the salts per se. It is rather possible to produce the phosphonium compounds, before addition of the penicillin-sulfoxide ester, in the solvent to be used later on.

Further methods for preparing the phosphonium salts used according to the invention are described in "Neuere Methoden der Praparativen Organischen Chemie," vol. III, p. 72 et seq. (Verlag Chemie, 1960).

The 1-azetidine - 2 - one-carbmethoxymethyl-triphenylphosphonium-p-toluene-sulfonates have proved particularly suitable.

The ratio of pencillin-sulfoxide esters to the corresponding phosphonium salts may vary within wide limits.

Suitably, the phosphonium salt is used in a quantity of 1 to 50 molar percent. The ratio may also be increased above this limit, but this does not bring any technical advantage, in general. Preferably, the phosphonium salt is used in a quantity of 5 to 15 molar percent. In addition to the phosphonium salt of the above Formula 3, the ylid or the acid from which the phosphonium salt is derived may be added to the reaction mixture in a certain quantitative proportion which, however, should suitably not exceed 20 molar percent of the phosphonium compound. The same applies to that process variation of the invention which the phosphonium compound is produced, before addition of the penicillin-sulfoxide ester, in the solvent to be used on as the reaction medium.

The reaction is suitably carried out at a temperature between about 80° and 195° C. It is preferred, however, to operate in a temperature range of rom 90° to 130° C.

The reaction can be carried out in bulk, but yields then high proportions of by-products. In order to obtain a better course of the reaction, it is recommended to use a solvent. The reaction is preferably carried in such solvents which do not disturb the reaction and boil in the indicated temperature range, if necessary under reduced pressure or by addition of a lower-boiling solvent.

There are used, for example, ketones such as cyclohexanone, methylisopropylketone, methylisobutylketone, chlorinated hydrocarbons, in particular chlorobenzene, aromatic hydrocarbons, cyclic, straight chain or branched ethers, which boil in the indicated temperature range, dimethyl-sulfoxide, sulfolane, esters or carbonamides.

The reaction water formed during the reaction is preferably eliminated from the reaction mixture according to generally known laboratory methods.

When the reaction is completed, the final product crystallizes in many cases from the reaction mixture, with high purity. In other cases, the reaction mixture is washed with water, dried, concentrated and the residue is recrystallized. If solvents are used which are miscible with water, the final product can be precipitated, or, after removal of the solvent, be purified in the manner indicated above.

The Δ³-cephem esters constitute solid, in most cases crystalline, compounds, the infrared spectra of which differ in characteristic manner from those of the starting compounds. Some examples are shown in the following table:

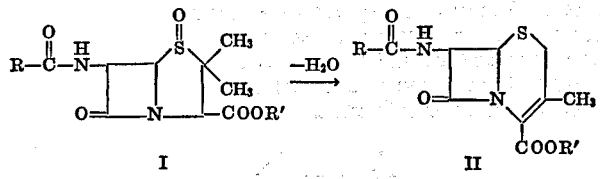

| R | R'— | | Amide | Ester | β-Lactam | NH |
|---|---|---|---|---|---|---|
| Ia<br>IIa | }C₆H₅-CH₂ | O₂N-⟨ ⟩-CH₂ | 1,690<br>1,640 | 1,750<br>1,720 | 1,790<br>1,760 | 3,370<br>3,260 |
| Ib<br>IIb | }Same | (C₆H₅)₂CH | { 1,680<br>1,655 | 1,750<br>1,720 | 1,790<br>1,765 | 3,375<br>3,280 |
| Ic<br>IIc | }----do---- | O₂N-⟨ ⟩-CH₂ | 1,690<br>1,665 | 1,735<br>1,720 | 1,785<br>1,770 | 3,400<br>3,270 |
| Id<br>IId | }----do---- | (C₆H₅)₂CH | { 1,685<br>1,675 | 1,750<br>1,720 | 1,790<br>1,765 | 3,380<br>3,280 |
| Ie<br>IIe | }----do---- | Same as above | { 1,685<br>1,665 | 1,750<br>1,715 | 1,790<br>1,765 | 3,360<br>3,270 |

The Δ³-cephem esters obtained in this way serve as intermediate products, but they may partly also be used as such as therapeutic agents.

According to the process of the invention, the Δ³-cephem esters are obtained with high yields. The simplified method of operation, according to which the desired products are obtained with a very high purity and can be further processed without other purification operations, is of particular advantage. Another very essential advantage is that the reaction is completed even after a short time, so that a high space-time yield is attained.

Preparation of the phosphonium compounds

The phosphonium compounds used according to the invention can be prepared in the following manner:

The reaction of α-halogenated carboxylic acid esters with triphenyl-phosphine yields phosphonium halides, which can easily de-protonize to give triphenyl-phosphine carboxymethyl (Helv. Chem. Acta 40, 1242 (1957)) and are subsequently converted by reaction with other acids into carboxymethyl-phosphonium salts.

Thus, phosphonium compounds of the formula

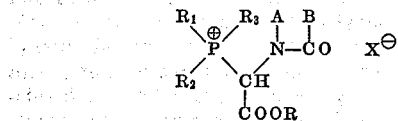

in which R₁, R₂, R₃, A, B and X⊖ have the meanings given above and R represents an alkyl group having 1 to 8 carbon atoms, and which may also be substituted, are obtained by reacting acid amides or lactams of the formula

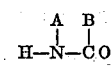

with glyoxyl esters of the formula

OHC—COOR, reacting the hydroxyacetic acid derivatives of the formula

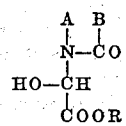

so obtained in the presence of acid-binding agents with halogenating agents such as thionyl chloride to obtain halogeno-acetic acid derivatives of the formula

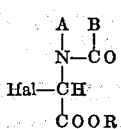

and reacting the latter with phosphines of the formula

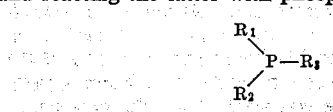

In the compounds so obtained, X⊖ represents a halogen ion. These compounds may then, if desired, be converted by treatment with hydrohalic acid-binding agents into the corresponding ylide-carboxylic esters, which may be converted to the phosphonium compounds of the above-mentioned formula by a reaction with any other desired acid.

In the indicated manner, there are obtained 1-azetidine-2-ono-carboxymethylphosphonium salts by preparing, from 4,4-dimethylazetidine-2-one and glyocylic acid methyl ester semi-acetal, 1-(4,4-dimetylazetidine-2-ono)-hydroxyacetic acid-methyl ester melting at 113°–114.5° C., which yields with thionyl chloride the corresponding chloroacetic acid methyl ester which is converted, in the above-described way with triphenyl-phosphine, into triphenyl-phosphine-1-(4,4-dimethyl-azetidine-2-ono)-carbmethoxymethylene having a melting point of 207°–208° C.

In analogous manner, there can be obtained from racemic 4-methylazetidine-2-one, racemic triphenylphosphine-1-(4-methylazetidine-2-ono)-carbmethoxymethylene having a melting point of 218–219° C.

Both carbmethoxymethylene compounds react with acids to form the azetidine-2-ono-carboxymethyl-phosphonium salts used according to the invention. Thus, there is obtained from 4,4-dimethylazetidine-2-ono-carbmethoxymethylene-triphenylphosphine and p-toluenesulfonic acid the corresponding 4,4-dimethylazetidine-2-ono-carbmethoxymethyl-triphenyl-phosphonium salts in the form of colorless crystals melting at 154°–156° C. (decomposition) (from ethyl acetate).

The phosphonium compounds of higher lactams are obtained in analogous manner.

The following examples illustrate the invention:

EXAMPLE 1

A solution of 10.0 g. of pencillin-V-sulfoxide methyl ester in 450 ml. of methyl-isobutyl ketone was combined with 1.81 g. of 4,4-dimethylazetidinone-2-ono-carbmethoxymethyl-triphenyl-phosphonium - p - toluenesulonate and the whole was heated for 2½ hours under reflux, the reaction water formed being separated over a column head.

The orange brown reaction mixture was washed twice with 100 ml. portions of water. The organic phase was concentrated, after drying, over Na₂SO₄ and recrystallized from ether with the addition of a small amount of methanol. Thereupon, 5.69 g. (59% of the theory) of 7-phenoxyacetamido-3-methyl - Δ³ - cephem-4-carboxylic acid methyl ester precipitated in the form of slightly colored needles melting at 132–135° C., which, after recrystallization from methanol, melt at 139–140° C.

EXAMPLE 2

A solution of 380 mg. of p-toluene-sulfonic acid hydrate in 300 ml. of methyl-isobutyl ketone was heated under reflux until the total amount of water from the reaction mixture had been removed over a column head. Then, 860 mg. of triphenyl-phosphine-1-(4,4-dimethyl-azetidine-2-ono)-carbmethoxymethylene were added and the phosphonium compound was thus prepared in this manner. After 5 minutes, 7.6 g. of penicillin-V-sulfoxide methyl ester were added to the hot solution and the whole was heated for 1½ hours as described in Example 1.

Upon working up in the manner as described in Example 1, 4.1 g. (56.8% of the theory) of 7-phenoxyacetamido-3-methyl-Δ³-cephem-4-carboxylic acid methyl ester were obtained in the form of colorless crystals melting at 130°–133° C.

EXAMPLE 3

10.0 g. of penicillin-V-sulfoxide-p-nitrobenzyl ester were added to a solution of 1.3 g. of 4,4-dimethylazetidine-2 - one - carboxymethyl-triphenyl-phosphonium-p-toluene-sulfonate in 400 ml. of methyl-isobutyl ketone and the whole was heated under reflux while removing the reaction water as described in the preceding examples. The p-nitrobenzyl ester passed into solution only at the boiling temperature. After 2 hours, a red brown solution had formed which was concentrated to half its volume, whereupon large quantities of the re-arranged product had already precipitated. After completion of the crystallization, 6.43 g. (67% of the theory) of 7-phenoxyacetamido-3-methyl-Δ³-cephem-4-carboxylic acid-p-nitrobenzyl ester in the form of almost colorless crystals melting at 188°–190° C. were isolated. The mother liquor was concentrated, the residue was taken up in methylene chloride and washed several times with water after drying, the solvent was evaporated. From methanol with addition of pyridine, there crystallized in the course of 24 hours 0.83 g. of pure product melting at 186°–189° C., which increased the yield to 75.5% of the theory.

EXAMPLE 4

A solution of 9.6 g. of penicillin-G-sulfoxide-p-nitrobenzyl ester in 400 ml. of methyl-isobutyl-ketone and 1.3 g. of the phosphonium salt mentioned in Example 1 were heated for 1 hour under reflux. Upon cooling, 4.26 g. (46% of the theory) of 7-phenacetylamino-3-methyl-$\Delta^3$-cephem-4-carboxylic acid-p-nitrobenzyl ester melting at 221°–223° C. precipitated.

EXAMPLE 5

1.45 g. of triphenylphosphine-methyl-carbethoxymethylene were reacted in 400 ml. of methyl-isobutyl-ketone with 760 mg. of p-toluenesulfonic acid to obtain carbethoxyethyl - $\alpha$ - triphenyl-phosphonium-p-toluene-sulfonate and the reaction mixture was heated under reflux until the reaction water was eliminated over a column head.

10.0 g. of penicillin-V-sulfoxide-p-nitrobenzyl ester were introduced, while stirring, into the hot solution and the whole was heated for 2 hours, while simultaneously removing the water formed. After concentration, the crystal magma was taken up in methylene chloride and washed with water. The organic phase was dried over $Na_2SO_4$ and concentrated. The residue was recrystallized from methanol with the addition of a small amount of pyridine.

4.96 g. (51.5% of the theory) of 7-phenoxyacetamido-3-methyl-$\Delta^3$-cephem-4-carboxylic acid-p-nitrobenzyl ester in the form of almost colorless crystals melting at 186°–189° C. were obtained.

EXAMPLE 6

The phosphonium salt mentioned in Example 1 was prepared from 210 mg. of p-toluene-sulfonic acid hydrate and 516 mg. of triphenylphosphine-1-(4,4-dimethylazetidine-2-ono)-carbomethoxy-methylene in 300 ml. of methyl-isobutyl-ketone and heated for 5 minutes under reflux, while removing the moisture by cycling in a water separator.

4.56 g. of penicillin-V-sulfoxide-acid benzyl ester were added, whereupon heating was continued for 2½ hours under reflux.

After cooling of the reaction mixture, it was washed twice with 50 ml. portions of water. The organic phase was dried over $Na_2SO_4$ and then evaporated. The residue crystallized spontaneously. After recrystallization from methanol, 2.84 g. (65% of the theory) of 7-phenoxyacetamido-3-methyl-$\Delta^3$-cephem-4-carboxylic acid benzyl ester melting at 155°–156° C. were obtained in the form of colorless needles.

EXAMPLE 7

In the manner described in Example 6, 7-phenoxyacetamido-3-methyl-$\Delta^3$-cephem-4-carboxylic acid benzhydryl ester melting at 155°–156° C. was obtained in a yield of 60% from penicillin-V-sulfoxide acid benzhydryl ester.

EXAMPLE 8

A phosphonium salt was prepared in the manner described in Example 6 in 150 ml. of methyl-isobutyl ketone from 105 mg. of p-toluene-sulfonic acid hydrate and 260 mg. of triphenylphosphine-1-(4,4-dimethylazetidine-2-ono)-carbmethoxymethylene.

Then, 2.58 g. of penicillin-G-sulfoxide acid benzhydryl ester were added, the whole was heated for 2½ hours under reflux and after washing with water, the solvent was removed. A light-brown amorphous residue remained behind which was dissolved in hot methanol and which separated in the form of a gel, which was filtrable, upon addition of a small amount of water. After drying, 1.81 g. (73% of the theory) of 7-phenacetylamido-3-methyl-$\Delta^3$-cephem-4-carboxylic acid benzhydryl ester melting at 168° C.–170° C. were obtained, which appeared uniform in a thin layer chromatogram (eluant ethyl acetate/petroleum ether 2:1).

EXAMPLE 9

The phosphonium salt mentioned in Example 1 was prepared from 105 mg. of p-toluene-sulfonic acid hydrate and 258 mg. of triphenylphosphine-1-(4,4-dimethylazetidine-2-ono)-carbmethoxymethylene in a mixture of 100 ml. of chlorobenzene and 50 ml. of benzene and the whole was heated for 5 minutes under reflux, during which time the moisture present was eliminated over a water separator. Then, 2.51 g. of penicillin-V-sulfoxide-p-nitrobenzyl ester were added and the whole was heated for further 20 minutes while removing the water. The solvent was eliminated under reduced pressure and the residue was recrystallized from methanol, whereupon 1.37 g. (56.5% of the theory) of 7-phenoxyacetamido-3-methyl-$\Delta^3$-cephem-4-carboxylic acid-p-nitrobenzyl ester melting at 187–189° C. were obtained.

EXAMPLE 10

A mono-basic phosphonium phosphonate was prepared from 332 mg. of 4-methylpentane-phosphonic acid and 860 mg. of triphenyl-1-(4,4-dimethylazetidine-2-ono)-carbmethoxymethylene in 400 ml. of methyl-isobutyl ketone and combined, at the boiling temperature, with 10.0 g. of p-nitro-benzyl ester of penicillin-V-sulfoxide-acid. The mixture was heated for 4 hours under reflux, during which time the water formed was removed through a water separator.

The reaction mixture was then cooled. After 16 hours, 7.13 g. (74% of the theory) of almost colorless needles of 7-phenoxyacetamido-3-methyl-$\Delta^3$-cephem-4-carboxylic acid-p-nitrobenzyl ester melting at 186°–189° C. were obtained.

EXAMPLE 11

The corresponding 1-(4-methylazetidine-2-ono)-carbmethoxymethyl - triphenyl - phosphonium - p - toluene-sulfonate was prepared from 190 mg. of p-toluene-sulfonic acid hydrate and 420 mg. of triphenyl-1-(4-methylazetidine-2-ono)-carbmethoxymethylene in 300 ml. of methyl-isobutyl ketone. To the solution of the phosphonium salt formed, 10.0 g. of penicillin-V-sulfoxide acid-p-nitrobenzyl ester were added and the whole was heated for 2¼ hours under reflux, while removing the reaction water over a water separator.

The reaction mixture was concentrated to about ⅓ of its volume and allowed to stand at room temperature. 7.85 g. (81.5% of the theory) of slightly colored needles of 7-phenoxyacetamido-3-methyl-$\Delta^3$-cephem-4-carboxylic acid-p-nitrobenzyl ester melting at 188°–189° C. crystallized.

EXAMPLE 12

5.0 g. of penicillin-V-sulfoxide-p-nitrobenzyl ester were added to 350 ml. of methyl-isobutyl ketone, 190 mg. of p-toluenesulfonic acid hydrate and 400 mg. of triphenylphosphine - N - methyl - N-acetyl-carbmethoxymethylene. The whole was heated for 2¾ hours under reflux and the water that had formed was removed over a water separator. The reaction mixture was washed shortly with water, dried and the solvent was separated until crystallization began, whereupon 2.28 g. (47% of the theory) of 7-phenoxyacetamido - 3 - methyl - $\Delta^3$ - cephem - 4 - carboxylic acid -p-nitrobenzyl ester melting at 188°–189° C. were obtained.

EXAMPLE 13

9.72 g. of penicillin-V-sulfoxy-p-methoxybenzyl ester were introduced into a solution of 1.3 g. of 4,4-dimethylazetidine - 2 - ono - carboxymethyl - triphenylphosphonium-p-toluene sulfonate in 300 ml. of methylisobutyl ketone and the whole was heated for 2 hours under reflux, while removing the water split off during the reaction. After cooling, the solution was shortly washed with water, the solution was concentrated and the residue was recrystallized from a mixture of ether and isopropanol, whereupon 5.14 g. (55% of the theory) of colorless needles of 7-phenoxyacetamido-3-methyl-$\Delta^3$-cephem-4-carboxylic acid-p-methoxybenzyl ester melting at 154°–156° C. crystallized.

EXAMPLE 14

90 mg. of p-toluene-sulfonic acid hydrate were dissolved in 100 ml. of methyl-isobutyl ketone, the whole was heated for 10 minutes under reflux, during which time the moisture was removed by distillation, and the corresponding phosphonium salt was prepared by adding 250 mg. of triphenylphosphine-ε-caprolactamoyl-carbmethoxymethylene. The solution so prepared was combined, while hot, with 2.53 g. of the sulfoxide of of 6-(3-thienyl-oxyacetamido)-penicillanic acid-p-nitrobenzyl ester. The whole was then heated for 1¼ hours while removing the reaction water, and then the still hot solution was washed shortly with water. Upon cooling, 1.26 g. (52 of the theory) of 7-(3-thienyloxyacetamido)-3-methyl-$\Delta^3$-cephem-4-carboxylic acid-p-nitrobenzyl ester melting at 208°–210° C. crystallized from the organic phase.

EXAMPLE 15

The phosphonium salt was prepared in a manner analogous to that described in Example 14 from 190 mg. of p-toluene-sulfonic acid and 500 mg. of triphenylphosphine-ε-caprolactamoyl-carbmethoxymethylene in 150 ml. of methyl-isobutyl-ketone and then reacted with 5.0 g. of penicillin-V-sulfoxy-trichloroethyl ester. After heating for 2 hours, while removing the reaction water, the mixture was cooled and washed with water. The organic phase was dried, concentrated, and the residue was recrystallized from isopropyl ether with addition of a few drops of methanol. 2.26 g. (47% of the theory) of 7-phenoxyacetamido-3-methyl-$\Delta^3$-cephem-4-carboxylic acid-2,2,2-trichloroethyl ester melting at 112–113° C. were obtained.

The following examples illustrate the preparation of the ylide-carboxylic esters or phosphonium compounds used according to the invention:

Example 1A (a) Upon heating of a mixture of 19.8 g. (0.2 mole) of 4,4-dimethylazetidine-2-one, 30 g. (0.25 mole) of glyoxylic acid methyl ester semi-acetal and 100 ml. of toluene, at first 50 ml. of methanol/toluene were distilled off. The reaction mixture was kept for 2 hours at 100°–110° C., cooled and combined with 50 ml. of benzene, whereupon 33.0 g. (88.3% of the theory) of 1-(4,4-dimethylazetidine-2-ono)-hydroxyacetic acid methyl ester in the form of colorless crystals melting at 113°–114.5° C. were obtained.

$C_8H_{13}NO_4$ (187.2).—Calc. (percent): C, 51.33; H, 7.0; N, 7.48. Found (percent): C, 51.4; H, 7.4; N, 7.6.

(b) A solution of 18.7 g. (0.1 mole) of hydroxyacetic acid methyl ester in 200 ml. of $CH_2Cl_2$ was cooled to −15° C., with exclusion of moisture, combined with 10.1 g. (0.1 mole) of triethylamine in 50 ml. of $CH_2Cl_2$ and then combined, while stirring vigorously, within 10 minutes, at the same temperature, with a solution of 11.9 g. (0.1 mole) of thionyl chloride in 50 ml. of $CH_2Cl_2$. The reaction mixture was stirred for 1 hour without cooling and then contained 4,4-dimethyl-azetidine-2-ono-chloroformic acid methyl ester. The solution was combined, without any purification operation, with 30 g. (0.115 mole) of triphenylphosphine and boiled for 2 hours under reflux, during which time large amounts of $SO_2$ which had formed previously escaped. In this manner, 1-(4,4-dimethylazetidine - 2 - ono) - carbmethoxymethyl - triphenyl-phosphonium chloride was formed.

After cooling, the reaction mixture was poured onto 500 ml. of ice water, the pH-value was adjusted to 6–7 while stirring with 2 N NaOH, the whole was further stirred for 10 minutes and the organic phase was separated.

The aqueous phase was extracted once again with $CH_2Cl_2$, the combined organic extracts were dried over $Na_2SO_4$, concentrated and the residue was recrystallized from benzene. 41.9 g. (97% of the theory) of triphenyl phosphine - 1 - (4,4 - dimethylazetidine - 2 - ono) - carbmethoxymethylene melting at 207–208° C. were obtained.

$C_{26}H_{26}NO_3P$ (431.5).—Calc. (percent): C, 72.37; H, 6.08; N, 3.23; P, 7.18. Found (percent): C, 72.5; H, 6.2; N, 3.3; P. 7.3.

Example 2A 24 g. of glyoxylic acid methyl ester-methyl semi-acetal (0.2 mole) were heated with 19.8 g. (0.2 mole) of 4,4-dimethylazetidine-2-one, while stirring, for 30 minutes, to 90°–95° C., during which time the methanol formed was removed by distillation. The reaction mixture, which at the beginning was thinly liquid, solidified after a short time so that the stirrer had to be switched off. Finally, the whole was dried shortly under reduced pressure. The reaction product was taken up in methylene chloride and reacted in the manner described in Example 1A(b).

76.5 g. (89% of the theory) of triphenyl-phosphine-1-(4,4-dimethylazetidine - 2 - one)-carbmethoxymethylene melting at 207°–208° C. (benzene) were obtained.

Example 3A 11 g. (59 mmoles) of the hydroxyacetic ester of Example 1A(a) were dissolved in 30 ml. of chloroform and combined with 7.5 g. (7.4 mmoles) of triethylamine, cooled to −10° C. and combined, within 5 minutes, with a solution of 7.2 g. of thionyl chloride in 20 ml. of chloroform. The reaction mixture was stirred for 2 hours and then concentrated. The residue was combined with benzene in order to remove the triethyl-ammonium hydrochloride. After filtration with exclusion of moisture, 12.2 g. (100% of the theory) of crude 1 - (4,4 - dimethylazetidine - 2 - ono)-chloroformic acid methyl ester were obtained; the compound was taken up in anhydrous benzene, filtered and combined with 23.6 g. of triphenylphosphine. The reaction mixture was stirred for 3 hours at 50° C., during which time large amounts of colorless crystals formed which were filtered off with suction and washed with benzene and then with hexane. 23.8 g. (86.5% of the theory referred to the hydroxy compound) of 1 - (4,4 - dimethylazetidine - 2 - one) - carbmethoxymethyltriphenyl phosphonium chloride melting at 156°–158° C. (decomposition) were obtained.

Example 4A

By reacting 17 g. of racemic 4-methylazetidine-2-one with glyoxylic acid methyl ester semi-acetal in toluene, concentrating the reaction mixture and proceeding otherwise as described in Example 1A(b), there were obtained, without isolation of an intermediate compound, 69.5 g. (83.5% of the theory) of triphenylphosphine - 1 - (4-methylazetidine - 2 - ono) - carbmethoxymethylene melting at 215°–218° C. (benzene/hexane).

$C_{25}H_{24}NO_3P$ (417.4).—Calc. (percent): C, 71.96; H, 5.8; N, 3.35; P, 7.42. Found (percent): C, 72.0; H, 5.9; N, 3.6; P, 7.1.

Example 5A 24 g. (0.2 mole) of glyoxylic acid methyl ester methyl-semiacetal were heated in 100 ml. of toluene with 2.54 g. (0.2 mole) of ε-caprolactam in such a manner that a mixture of methanol and toluene distilled off. The reaction mixture was then kept for 3 hours at 90° C., concentrated and the hydroxy compound that had formed was taken up in 70 ml. of methylene chloride. After addition of 2 g. (0.22 mole) of triethylamine, a solution of 23.8 g. (0.2 mole) of thionyl chloride in 50 ml. of methylene chloride was added dropwise at −15° C. The reaction mixture was stirred for 30 minutes at this temperature. The chloroacetic ester that had formed was combined at room temperature with 54 g. (0.2 mole) of triphenylphosphine and boiled for 2 hours under reflux; the solution of the phosphonium chloride was combined with water and the pH-value of the mixture was adjusted to 8.5 by means of 2 N NaOH. After separation of the organic phase, the mixture was dried, concentrated and the oil that remained was recrystallized from a mixture of benzene and isopropyl ether.

51.9 g. (58.3% of the theory) of triphenylphosphine-1-(tetrahydroazepine - 2 - ono) - carbmethoxymethylene melting at 168° C. were obtained.

Example 6A

In analogous manner, triphenylphosphine-N-methyl-acetamido-carbmethoxymethylene melting at 189°–190° C. was obtained from N-methylacetamide.

$C_{24}H_{24}NO_3P$ (405.4).—Calc. (percent): C, 71.2; H, 5.95; N, 3.47; P, 7.65. Found (percent): C, 71.6; H, 5.9; N, 3.5; P, 7.4.

The ylide carboxylic esters described in the preceding examples can then be converted into the corresponding phosphonium compounds by treatment with organic or inorganic acids.

We claim:
1. A process for preparing a cephem-carboxylic acid ester of the formula

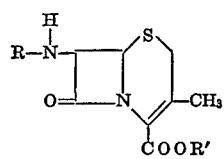

wherein R is acyl and R' is alkyl, substituted alkyl, cycloalkyl, or aryl, which process comprises heating a penicillin oxide of the formula

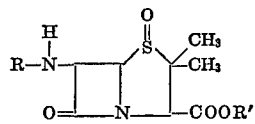

wherein R and R' have their earlier meanings, in a solvent at a temperature between 80° C. and 195° C., with from 1 to 50 molar percent of a phosphonium salt of the formula

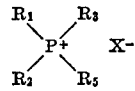

wherein $R_1$, $R_2$, and $R_3$ each represent substituted or unsubstituted hydrocarbon, and $R_4$ is methyl substituted by an electron-attracting group and may contain a further substituent, and $X^-$ is an acid anion.

2. A process as in claim 1 wherein the reagents are heated at a temperature between 90° C. and 130° C.

3. A process as in claim 1 wherein the phosphonium salt is present in an amount of from 5 to 15 molar percent.

4. A process as in claim 1 wherein $R_1$, $R_2$, and $R_3$ are the same or different alkyl or aryl and $R_4$ is methyl substituted by a first member selected from the group consisting of cyano, carbalkoxy, p-nitrophenyl, or acyl, and optionally by a second member selected from the group consisting of lower alkyl, aryl, or acyl-amido of the formula

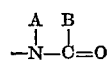

wherein A and B are the same or different alkyl having 1 to 8 carbon atoms or are such alkyl groups substituted with phenyl, or wherein A is alkyl or phenyl-substituted alkyl and B is aryl, or wherein A and B, taken together, are alkylene or lower alkyl-substituted alkylene forming a ring with the atoms to which they are attached.

5. A process as in claim 4 wherein $R_1$, $R_2$, and $R_3$ are the same or different alkyl having 4 to 10 carbon atoms or benzenoid aryl.

6. A process as in claim 4 wherein said phosphonium salt is a compound of the formula

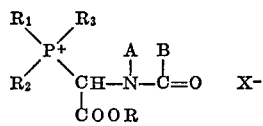

wherein R is substituted or unsubstituted alkyl having 1 to 8 carbon atoms.

References Cited
UNITED STATES PATENTS 3,275,626   9/1966   Morin et al. _____ 260—243

HENRY R. JILES, Primary Examiner
G. T. TODD, Assistant Examiner

U.S. Cl. X.R.
424—246